(12) United States Patent
Satou et al.

(10) Patent No.: US 12,420,402 B2
(45) Date of Patent: Sep. 23, 2025

(54) TEACHING DEVICE

(71) Applicant: FANUC CORPORATION, Yamanashi (JP)

(72) Inventors: Takashi Satou, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 18/259,779

(22) PCT Filed: Feb. 16, 2022

(86) PCT No.: PCT/JP2022/006253
§ 371 (c)(1),
(2) Date: Jun. 29, 2023

(87) PCT Pub. No.: WO2022/176928
PCT Pub. Date: Aug. 25, 2022

(65) Prior Publication Data
US 2024/0316756 A1    Sep. 26, 2024

(30) Foreign Application Priority Data
Feb. 18, 2021 (JP) .................................. 2021-024527

(51) Int. Cl.
*B25J 9/16* (2006.01)
*B25J 9/00* (2006.01)
*B25J 13/08* (2006.01)

(52) U.S. Cl.
CPC ........... *B25J 9/0081* (2013.01); *B25J 9/1671* (2013.01); *B25J 13/085* (2013.01)

(58) Field of Classification Search
CPC ...... B25J 9/0081; B25J 9/1671; B25J 13/085; G05B 2219/39451; G05B 2219/39529
See application file for complete search history.

(56) References Cited

U.S. PATENT DOCUMENTS

| | | |
|---|---|---|
| 2017/0312917 A1* | 11/2017 | Chung ................. G05B 19/423 |
| 2018/0361594 A1* | 12/2018 | Haddadin ............. B25J 9/1656 |
| 2021/0107135 A1* | 4/2021 | Takeuchi ............. G05B 19/423 |
| 2022/0161422 A1* | 5/2022 | Chen ..................... B25J 9/1694 |

FOREIGN PATENT DOCUMENTS

| | | |
|---|---|---|
| JP | 5338297 B2 | 11/2013 |
| JP | 2017-104944 A | 6/2017 |
| JP | 2019-081242 A | 5/2019 |
| JP | 2020-123049 A | 8/2020 |

* cited by examiner

*Primary Examiner* — Dalena Tran
(74) *Attorney, Agent, or Firm* — HAUPTMAN HAM, LLP

(57) ABSTRACT

A teaching device is provided with: a setting information storage unit for storing setting information defining a position and an attitude of a force sensor relative to a coordinate system set in a robot; and a virtual image superimposing and displaying unit for superimposing and displaying a virtual image in a real space including the robot or a prescribed object supporting the force sensor, or in a virtual space including a model of the robot or a model of the prescribed object, in such a way that a virtual image representing the force sensor adopts a position and an attitude corresponding to the setting information in the real space or the virtual space.

5 Claims, 8 Drawing Sheets

TEACHING DEVICE

RELATED APPLICATIONS

The present application is a National Phase of International Application No. PCT/JP2022/006253 filed Feb. 16, 2022, which claims priority to Japanese Application No. 2021-024527 filed Feb. 18, 2021.

FIELD

The present invention relates to a teaching device.

BACKGROUND

A force sensor may often be used when a robot performs work and the like for performing fine fitting, aligning gears and teeth, and aligning a surface of a workpiece. In such work, the force sensor mounted on the robot detects force and moment during the work, and performs control in such a way that the detected force and the detected moment have a predetermined value. An example of a robot system for performing such force control is described in PTL 1.

CITATION LIST

Patent Literature

[PTL 1] Japanese Patent No. 5338297 B

SUMMARY

Technical Problem

In the robot system using the force sensor as described above, positional information about the force sensor is held as internal data in a robot controller or a teaching device, and it may be difficult for a user or an operator to confirm whether the positional information (position and posture) about the force sensor is correctly set. Further, when incorrect positional information about the force sensor is set, the force control may not correctly operate, but an investigation to determine a cause (troubleshooting) when a robot does not correctly operate is difficult work that requires a high degree of expertise.

Solution to Problem

An aspect of the present disclosure is a teaching device including: a setting information storage unit configured to store setting information that defines a position and a posture of a force sensor with respect to a coordinate system set in a robot; and a virtual image superimposition display unit configured to superimpose and display a virtual image illustrating the force sensor on a real space including the robot or a predetermined object that supports the force sensor, or a virtual space including a model of the robot or a model of the predetermined object, in such a way that the virtual image has a position and a posture according to the setting information in the real space or the virtual space.

Advantageous Effects of Invention

According to the configuration described above, a user can quickly and easily visually recognize an error when there is the error in a set position and a set posture of a force sensor from a virtual image of the force sensor being superimposed and displayed on a real space or a virtual space.

The objects, the features, and the advantages, and other objects, features, and advantages will become more apparent from the detailed description of typical embodiments of the present invention illustrated in accompanying drawings.

DESCRIPTION OF EMBODIMENTS

Figure 1:
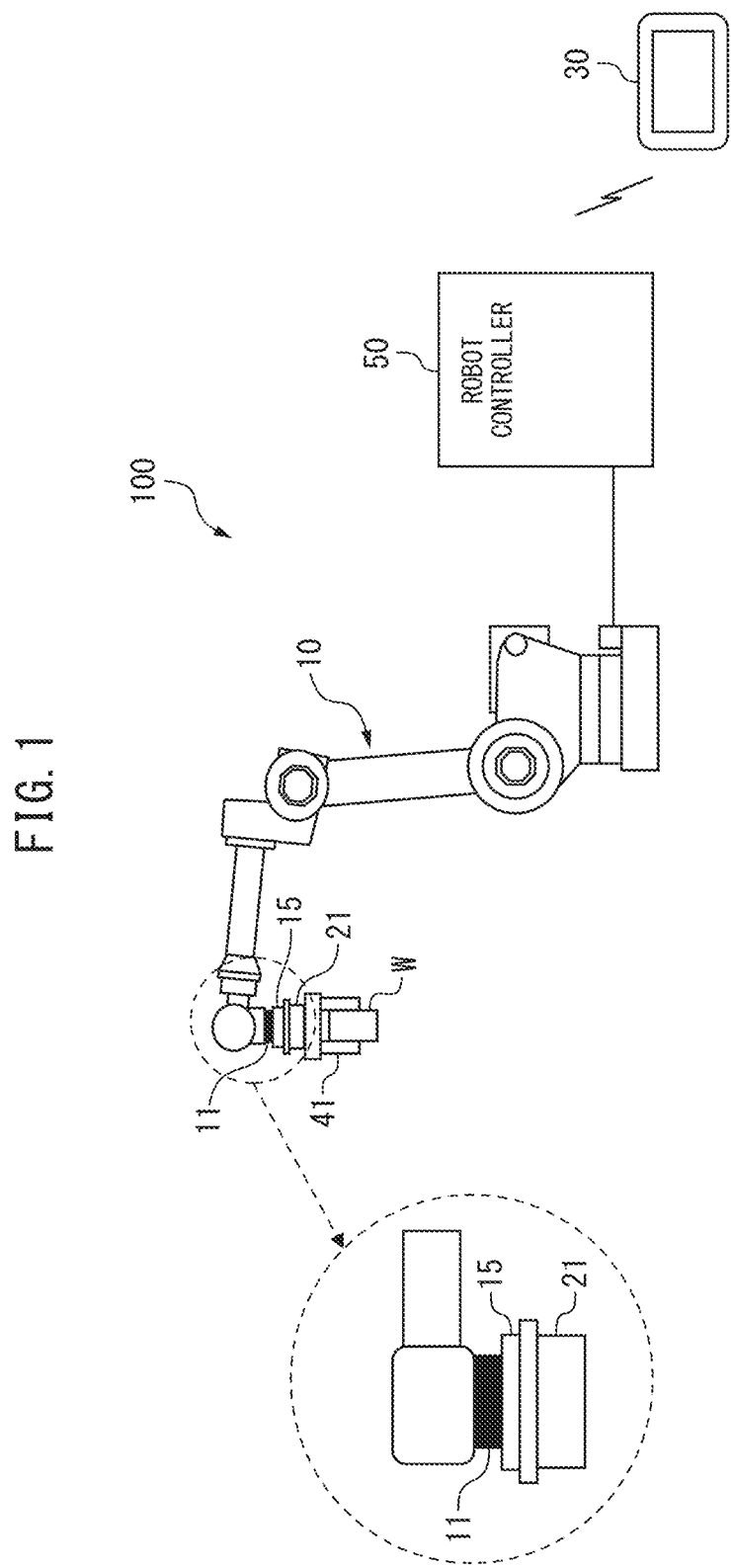
FIG. 1 is a diagram illustrating an apparatus configuration of a robot system according to a first embodiment.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

First Embodiment

FIG. 1 is a diagram illustrating an apparatus configuration of a robot system 100 including a teaching device 30 according to a first embodiment. The robot system 100 includes a robot 10, a robot controller 50 that controls the robot 10, and the teaching device 30 used for performing teaching (programming) of the robot 10.

The robot 10 includes a force sensor 21 mounted thereon, and is configured to be able to perform various types of work (such as fitting, pressing, phase alignment, polishing, and burr removal) by force control. For example, as illustrated in an enlarged view surrounded by a circle mark in FIG. 1, the force sensor 21 is attached to a flange 11 of an arm tip portion of the robot 10 via a bracket 15. FIG. 1 illustrates, as an example, a configuration in which a hand 41 is attached to a tip side of the force sensor 21. In this configuration, for example, the robot 10 can be caused to perform fitting work for fitting a workpiece W held by the hand 41 into a fitting hole of a target workpiece (not illustrated).

Figure 2:
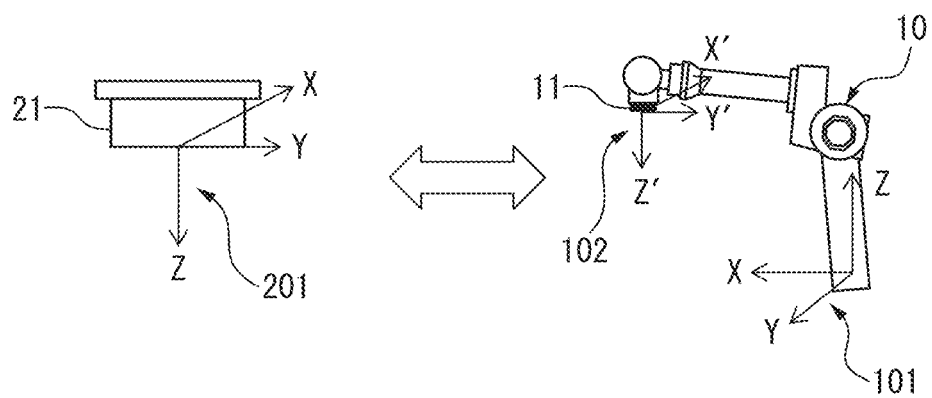
FIG. 2 is a diagram illustrating a coordinate system set in a robot and a coordinate system of a force sensor.

An output value (force/moment) of the force sensor 21 is output as a value in a coordinate system 201 of the force sensor 21 as illustrated in FIG. 2, and thus an output value of the force sensor 21 needs to be converted into a value in a coordinate system set in the robot 10 in order to obtain force/moment in a point of application of force in the robot controller 50. Note that a robot coordinate system 101 set in a base portion of the robot 10, a flange coordinate system 102 set in a flange surface, or the like may be the coordinate system set in the robot 10 (see FIG. 2).

In order to convert an output value of the force sensor 21 into a value in the coordinate system set in the robot 10, the robot system 100 holds, as internal data, setting information that defines a relationship between the coordinate system 201 of the force sensor 21 and the coordinate system set in the robot 10. The setting information that defines a relationship between the coordinate system 201 of the force sensor 21 and the coordinate system set in the robot 10 is set as a position and a posture of the force sensor 21 (coordinate system 201) with reference to the coordinate system set in the robot 10 as follows, for example.

Force sensor positional information(setting information)=$(x1, y1, z1, th1, th2, th3)$ Herein, x1, y1, and z1 are X, Y, Z coordinates of the force sensor 21 in the coordinate system of the robot 10, and th1, th2, and th3 are respectively rotational angles of the force sensor 21 about an X-axis, a Y-axis, and a Z-axis in the coordinate system of the robot 10.

For example, the positional information about the force sensor 21 is set and input via a set value input interface of the teaching device 30 and is reflected in the robot controller 50. When there is an error in such positional information about the force sensor 21, the robot 10 may not operate as intended, but an operation setting of the robot 10 is extremely complicated, and thus it is generally difficult for a user to determine the cause (that there is an error in the positional information about the force sensor). Under such circumstances, as described below, the teaching device 30 according to the present embodiment superimposes and displays a virtual image illustrating the force sensor on a virtual space or a real space, based on setting information that defines a position and a posture of the force sensor, and thus a user can quickly and easily visually recognize an error when there is the error in the setting information.

Figure 3:
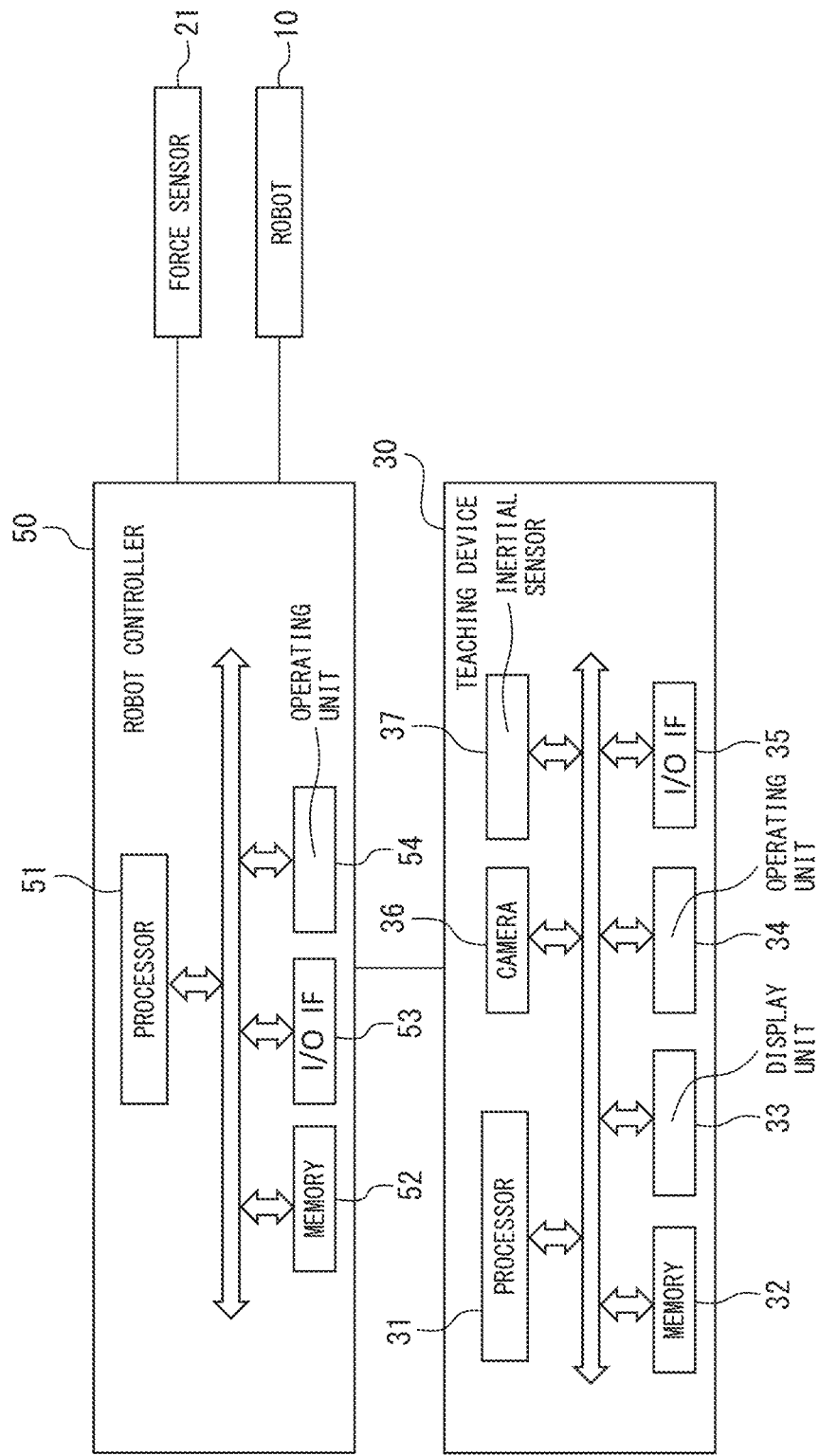
FIG. 3 is a diagram illustrating a hardware configuration example of a robot controller and a teaching device.

FIG. 3 is a diagram illustrating a hardware configuration example of the robot controller 50 and the teaching device 30. As illustrated in FIG. 3, the robot controller 50 may have a configuration as a general computer in which a memory 52 (such as a ROM, a RAM, a non-volatile memory), an input/output interface 53, an operating unit 54 including various operation switches, and the like are connected to a processor 51 via a bus. The teaching device 30 may have a configuration as a general computer in which a memory 32 (such as a ROM, a RAM, a non-volatile memory), a display unit (display) 33, an operating unit 34 formed of an input device such as a keyboard (or a software key), an input/output interface 35, and the like are connected to a processor 31 via a bus. The teaching device 30 according to the present embodiment may further include a camera 36 and an inertial sensor 37. The camera 36 is a camera that captures a two-dimensional image as an example, but a camera (such as a stereo camera) of another type may be used. The inertial sensor 37 is a sensor (such as a gyro sensor, and an acceleration sensor) used for performing position estimation by an odometry technique.

The teaching device 30 is connected to the robot controller 50 in a wired or wireless manner. The teaching device 30 is assumed to be a tablet type terminal herein, but various information processing devices such as a teaching operation panel, a smartphone, and a personal computer can be used as the teaching device 30.

Figure 4:
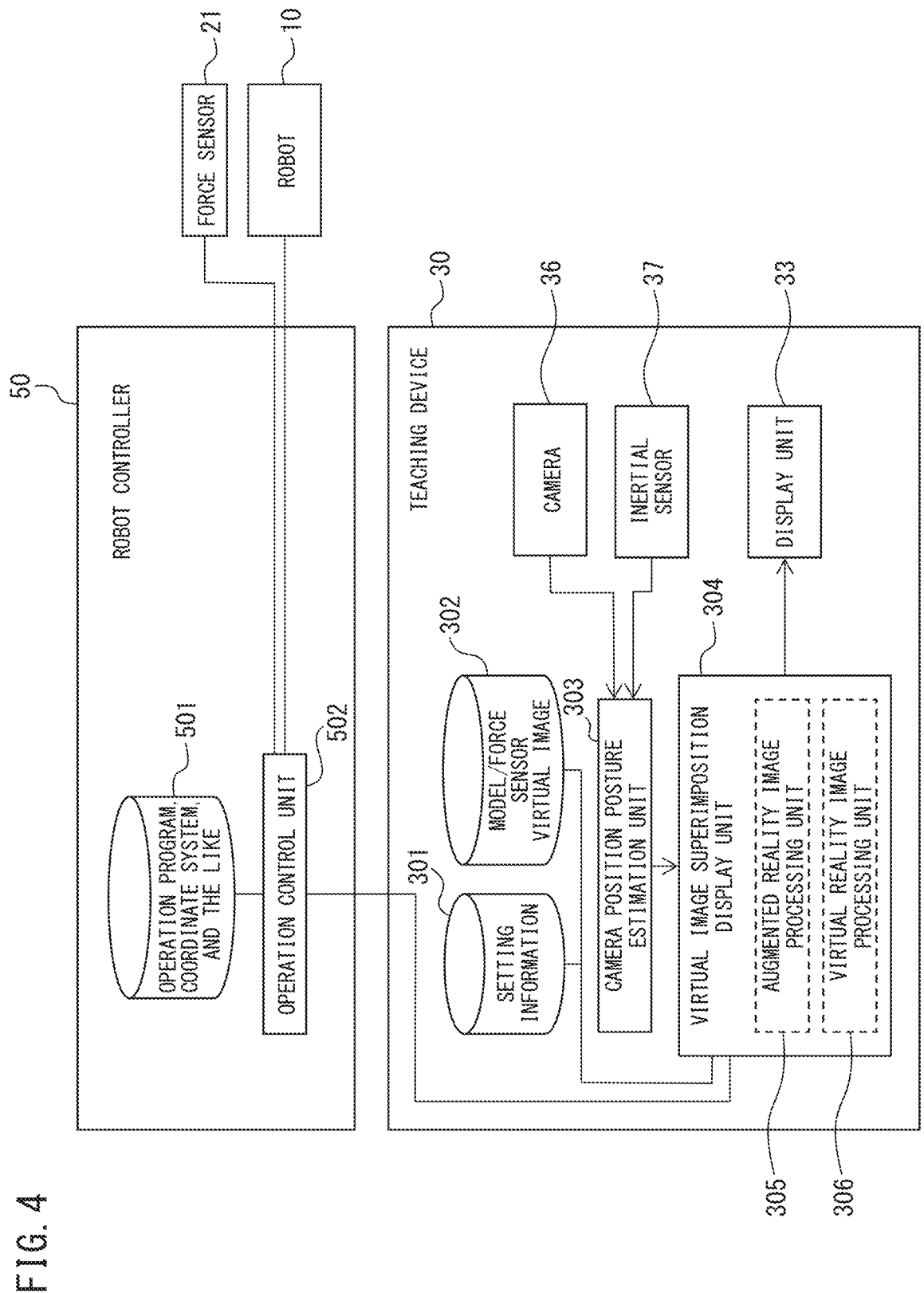
FIG. 4 is a functional block diagram of the robot controller and the teaching device.

FIG. 4 is a functional block diagram of the robot controller 50 and the teaching device 30. As illustrated in FIG. 4, the robot controller 50 includes a storage unit 501 that stores a setting related to an operation program and a coordinate system of a robot, and various types of other setting information, and an operation control unit 502 that controls an operation of the robot, based on the operation program and various types of the setting information. The operation control unit 502 performs force control, based on a detection value of the force sensor 21. Further, the operation control unit 502 provides, to the teaching device 30 in response to a request from the teaching device 30, position information and posture information about the robot 10 (control section of the robot) and information needed for the teaching device 30 to perform a function of the teaching device 30.

The teaching device 30 includes a setting information storage unit 301 that stores positional information (setting information) about the force sensor, a model data storage unit 302 that stores data about a 3D model of each object constituting the robot system 100 and data about a virtual image of the force sensor 21, a camera position posture estimation unit 303 that estimates a position and a posture of the camera 36, and a virtual image superimposition display unit 304. The setting information storage unit 301 may be formed of a non-volatile memory, or may be a temporary buffer formed in the RAM. Note that the setting information storage unit 301 may store various types of other information about a setting of the robot 10.

The virtual image superimposition display unit 304 has a function of superimposing and displaying a virtual image illustrating the force sensor 21 on a real space including the robot 10 or a predetermined object that supports the force sensor 21, or a virtual space including a model of the robot 10 or a model of the predetermined object, in such a way that the virtual image illustrating the force sensor 21 has a position and a posture according to setting information in the real space or the virtual space. Thus, the virtual image superimposition display unit 304 includes an augmented reality image processing unit 305 having a function of generating an augmented reality image, or a virtual reality image processing unit 306 having a function of generating a virtual reality image.

By the following procedure as an example, the camera position posture estimation unit 303 obtains a position and a posture of the camera 36 (teaching device 30) in a coordinate system (hereinafter, the coordinate system is assumed to be the robot coordinate system 101) fixed in a workspace of the robot 10, and tracks the position and the posture of the camera 36 (teaching device 30) in the coordinate system (robot coordinate system 101) fixed in the workspace.

(A1) The camera position posture estimation unit 303 acquires an arrangement position of the robot 10 in the workspace (robot coordinate system 101) from a storage unit in the robot controller 50 or the teaching device 30.

(A2) For example, the camera position posture estimation unit 303 captures a visual marker attached to the base portion of the robot 10 by the camera 36 (prompts a user to capture the visual marker). The visual marker is, for example, a marker known in the field having a visual pattern that can measure a position and a posture of a camera from a two-dimensional image in which the visual marker is captured.

(A3) The camera position posture estimation unit 303 recognizes a position and a posture of the camera 36 (teaching device 30) in the robot coordinate system by image-processing an image in which the visual marker is captured, and registers the position and the posture of the camera 36 (teaching device 30) in the robot coordinate system 101.

(A4) Hereinafter, the camera position posture estimation unit 303 obtains a movement of the camera 36 (teaching device 30) by the odometry technique, based on an output value of the inertial sensor 37, and continuously updates the position and the posture of the camera 36 (teaching device 30) in the robot coordinate system 101.

The augmented reality image processing unit 305 has a function of superimposing and displaying, on an image (video) captured by the camera 36, a virtual image of the force sensor 21 in a position and a posture according to positional information (setting information) about the force sensor 21, based on a position and a posture of the camera 36 (teaching device 30) acquired from the camera position posture estimation unit 303.

The virtual reality image processing unit 306 has a function of disposing a model of each object constituting the robot system 100 in a virtual space, based on actual arrangement positional information, and superimposing a virtual image of the force sensor 21 in the virtual space in a position and a posture according to positional information (setting information) about the force sensor 21.

Two examples in which the virtual image superimposition display unit 304 displays a virtual image of the force sensor 21 according to positional information (setting information) about the force sensor 21 will be described below. Note that, in the following display examples, the positional information (setting information) about the force sensor 21 is assumed to be set as positional information with respect to the flange coordinate system 102 set in the robot 10.

Display Example 1

Figure 5A:
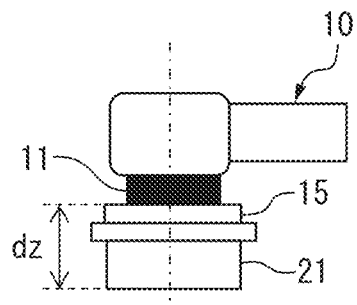
FIG. 5A is a diagram illustrating a first example of an arrangement of the force sensor.

As illustrated in FIG. 5A, in Display Example 1, the force sensor 21 is attached to the flange surface via the bracket 15 in such a way that a central axis of the force sensor 21 coincides with a central axis of the flange 11. In other words, the Z-axis in the flange coordinate system 102 and the Z-axis in the coordinate system of the force sensor 21 coincide with each other. In this case, positional information (setting information) about the force sensor 21 may be set to (0, 0, dz, 0, 0, 0) as a value in the flange coordinate system 102 of the robot 10.

Figure 5B:
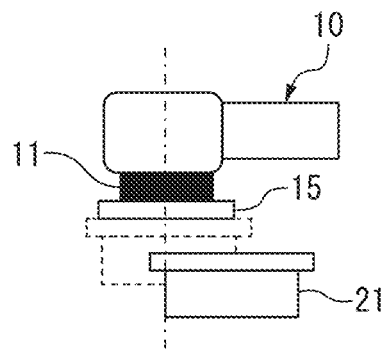
FIG. 5B is a diagram illustrating when there is an error in positional information about the force sensor in FIG. 5A.
Figure 6:
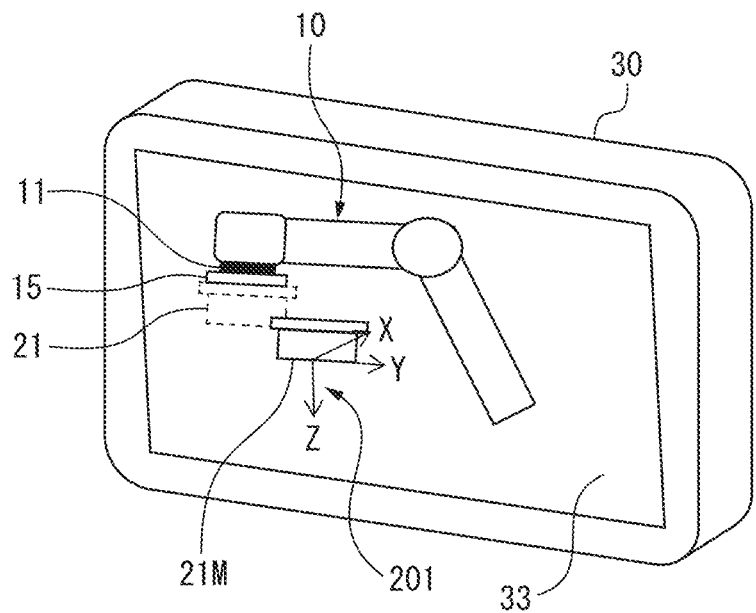
FIG. 6 is a diagram illustrating an image of a state where a virtual image of the force sensor is superimposed on a real space or a virtual space when there is an error in the positional information about the force sensor in FIG. 5A.

Herein, it is assumed that the positional information (setting information) about the force sensor 21 is set to (dx, dy, dz2, 0, 0, 0), dx≠0, dy≠0, dz2≠dz by mistake. In this case, the robot controller 50 obtains force and moment in a point of application of force by regarding the force sensor 21 in a position as illustrated in FIG. 5B, for example. As illustrated in FIG. 6, the virtual image superimposition display unit 304 of the teaching device 30 displays a virtual image (3D model) 21M of the force sensor 21 in a position and a posture according to the positional information (dx, dy, dz2, 0, 0, 0) about the force sensor 21 on an image in which the camera 36 of the teaching device 30 captures the robot 10. The augmented reality image processing unit 305 functions to display such an augmented reality image.

In this way, by displaying, in an image in a real space in which the robot 10 is captured, the virtual image 21M of the force sensor 21 in a position and a posture according to setting information on the display unit 33, a user can instantly recognize an error in positional information (setting information) about the force sensor 21 from a comparison between the robot 10 and the position of the virtual image 21M on a display screen or a comparison between a real object of the force sensor 21 and the position of the virtual image 21M on the display screen.

Note that, as illustrated in FIG. 6, an image illustrating the coordinate system 201 of the force sensor 21 in addition to the virtual image 21M of the force sensor 21 may be superimposed and displayed according to positional information (setting information) about the force sensor 21. In this case, a direction (posture) of the positional information (setting information) about the force sensor 21 is easily visually recognized, and an error in the setting information can be more appropriately visually recognized. Alternatively, an image illustrating the coordinate system 201 of the force sensor 21 instead of the virtual image 21M of the force sensor 21 may be superimposed and displayed as a virtual image of the force sensor 21.

Display Example 2

Figure 7A:
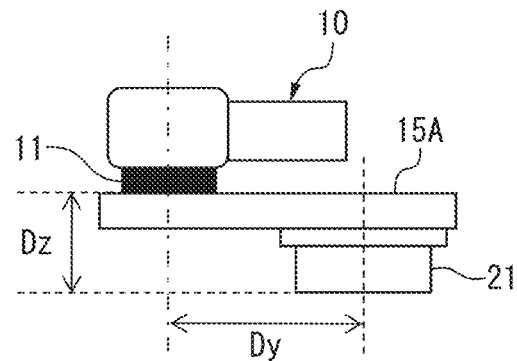
FIG. 7A is a diagram illustrating a second example of an arrangement of the force sensor.

As illustrated in FIG. 7A, Display Example 2 is an example in which the force sensor 21 is attached to the flange 11 via a bracket 15A having a relatively long shape in a horizontal direction in the drawing. In this case, a central axis of the force sensor 21 and a central axis of the flange 11 do not coincide with each other, and the force sensor 21 is attached to the bracket 15A in an offset manner to the horizontal direction (Y-axis direction) in the drawing. In the present example, positional information (setting information) about the force sensor 21 may be set to (Dx, Dy, Dz, 0, 0, 0) as a value in the flange coordinate system 102 of the robot 10.

Figure 7B:
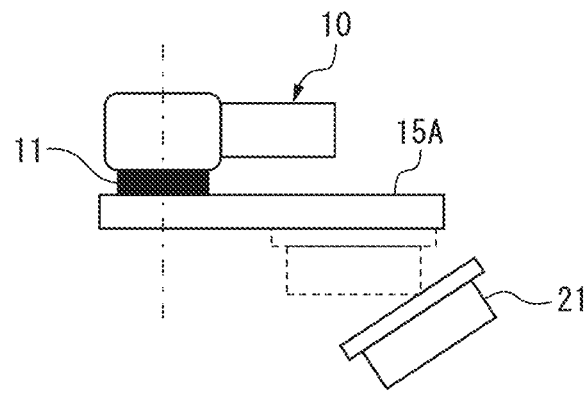
FIG. 7B is a diagram illustrating when there is an error in positional information about the force sensor in FIG. 7A.
Figure 8:
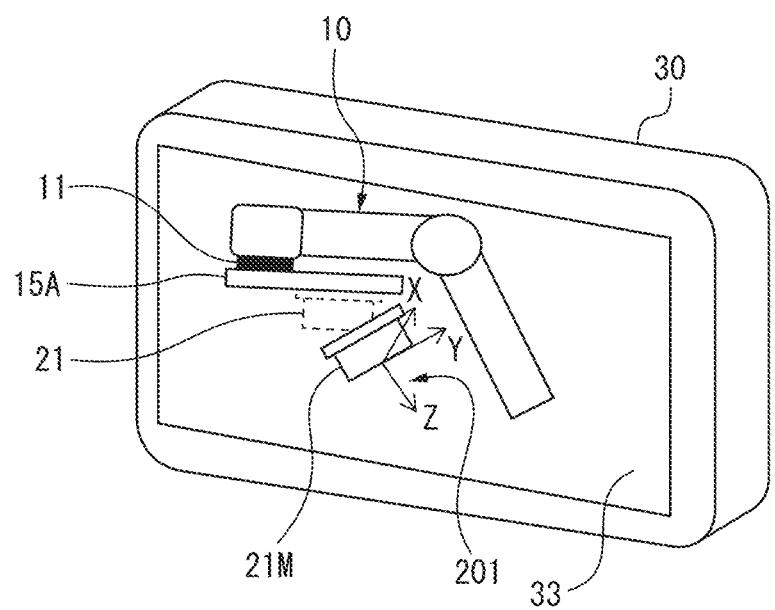
FIG. 8 is a diagram illustrating an image of a state where a virtual image of the force sensor is superimposed on a real space or a virtual space when there is an error in the positional information about the force sensor in FIG. 7A.

Herein, it is assumed that the positional information (setting information) about the force sensor 21 is set to (Dx2, Dy2, Dz2, th1, th2, th3), Dx2≠Dx, Dy2≠Dy, Dz2≠Dz, th1≠0, th2 #0, th3≠0 by mistake. In this case, the robot controller 50 obtains force and moment in a point of application of force by regarding the force sensor 21 in a position as illustrated in FIG. 7B, for example. As illustrated in FIG. 8, the virtual image superimposition display unit 304 (augmented reality image processing unit 305) of the teaching device 30 displays the virtual image (3D model) 21M of the force sensor 21 in a position and a posture according to the positional information (Dx2, Dy2, Dz2, th1, th2, th3) about the force sensor 21 on an image in which the camera 36 of the teaching device 30 captures the robot 10.

In this way, by displaying, in an image in a real space in which the robot 10 is captured, the virtual image 21M of the force sensor 21 in a position and a posture according to setting information on the display unit 33, a user can instantly recognize an error in positional information (setting information) about the force sensor 21 from a comparison between the robot 10 (or the bracket 15A) and the position of the virtual image 21M or a comparison between a real object of the force sensor 21 and the position of the virtual image 21M.

Note that, as illustrated in FIG. 8, an image illustrating the coordinate system 201 of the force sensor 21 in addition to the virtual image 21M of the force sensor 21 may be superimposed and displayed according to positional information (setting information) about the force sensor 21. In this case, a direction (posture) of the positional information (setting information) about the force sensor 21 is easily visually recognized, and an error in the setting information can be more appropriately visually recognized. Alternatively, an image illustrating the coordinate system 201 of the force sensor 21 instead of the virtual image 21M of the force sensor 21 may be superimposed and displayed as a virtual image of the force sensor 21.

In Display Example 1 and Display Example 2 described above, it is an augmented reality in which the virtual image 21M of the force sensor 21 is superimposed and displayed on an image in a real space, but the teaching device 30 may display the image as illustrated in FIGS. 6 and 8 as an image by a virtual reality. The virtual reality image processing unit 306 functions to perform display by such a virtual reality. In this case, the virtual reality image processing unit 306 generates an image in which each object constituting the robot system 100 is disposed in a virtual space, based on actual arrangement information. Then, the virtual reality image processing unit 306 superimposes and displays the virtual image 21M of the force sensor 21 in such a way that the virtual image 21M has a position and a posture according to positional information (setting information) about the force sensor 21 in the virtual space. Also in this case, a user can instantly recognize an error in the positional information (setting information) about the force sensor 21 from a comparison between a model of the robot 10 (or a model of the bracket) and the position of the virtual image 21M.

Note that, as a position of a point of view when an image by a virtual reality is generated, a camera position acquired by the camera position posture estimation unit 303 may be used, or a position of a point of view may be fixed in any position in a workspace. When a position of a point of view is fixed in any position in a workspace, the camera 36, the inertial sensor 37, and the camera position posture estimation unit 303 may be omitted from the teaching device 30.

Second Embodiment

Figure 9:
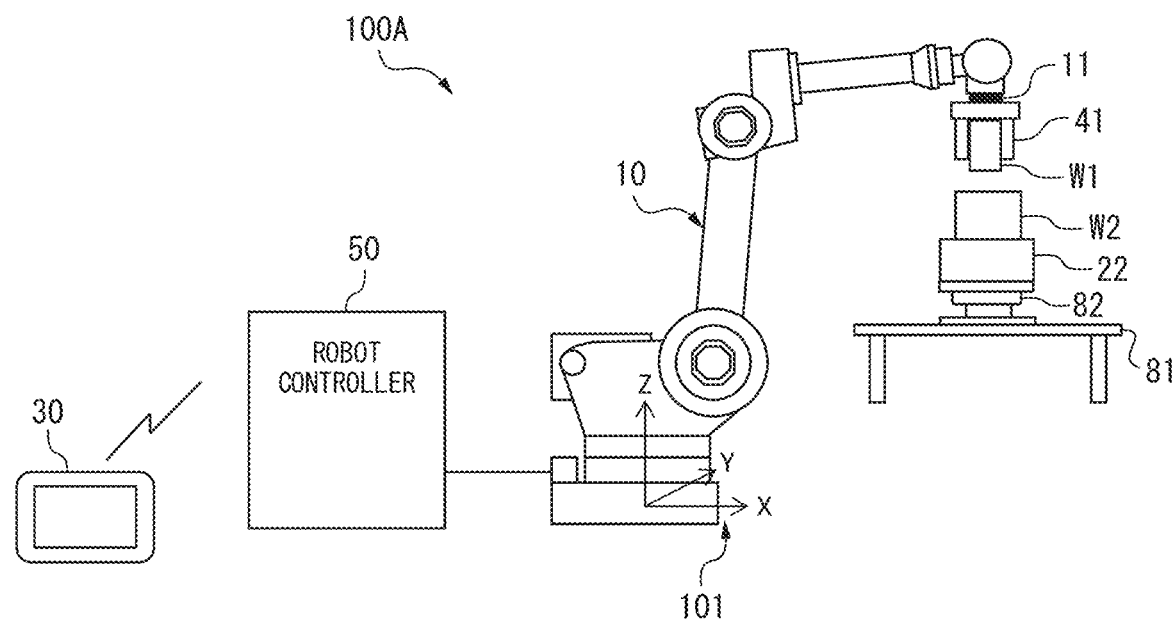
FIG. 9 is a diagram illustrating an apparatus configuration of a robot system according to a second embodiment.

A second embodiment is an example when an arrangement position of a force sensor is different from that in the first embodiment described above. FIG. 9 is a diagram illustrating a configuration of a robot system 100A according to the second embodiment. In the first embodiment, the force sensor 21 is mounted on the robot 10, but, in the second embodiment, a force sensor 22 is attached to a worktable 81 via a base 82. In other words, an object that supports the force sensor 21 is the robot 10 in the first embodiment, whereas an object that supports the force sensor 22 is the worktable 81 (or the base 82) in the second embodiment.

As illustrated in FIG. 9, the robot system 100A includes a robot 10, a robot controller 50, and a teaching device 30.

A function of the robot controller 50 and the teaching device 30 is similar to that in the first embodiment. A hand 41 is attached to a flange 11 of an arm tip portion of the robot 10. The hand 41 holds a workpiece W1. The robot 10 performs work for fitting the workpiece W1 into a fitting hole on a workpiece W2 fixed to the worktable 81 via the force sensor 22.

Figure 10:
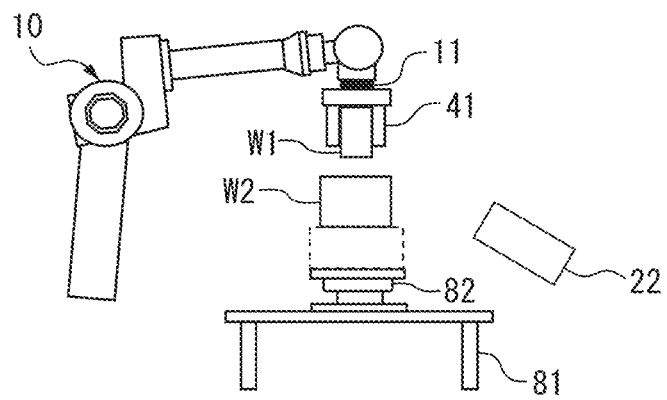
FIG. 10 is a diagram illustrating when there is an error in positional information about a force sensor in the robot system in FIG. 9.
Figure 11:
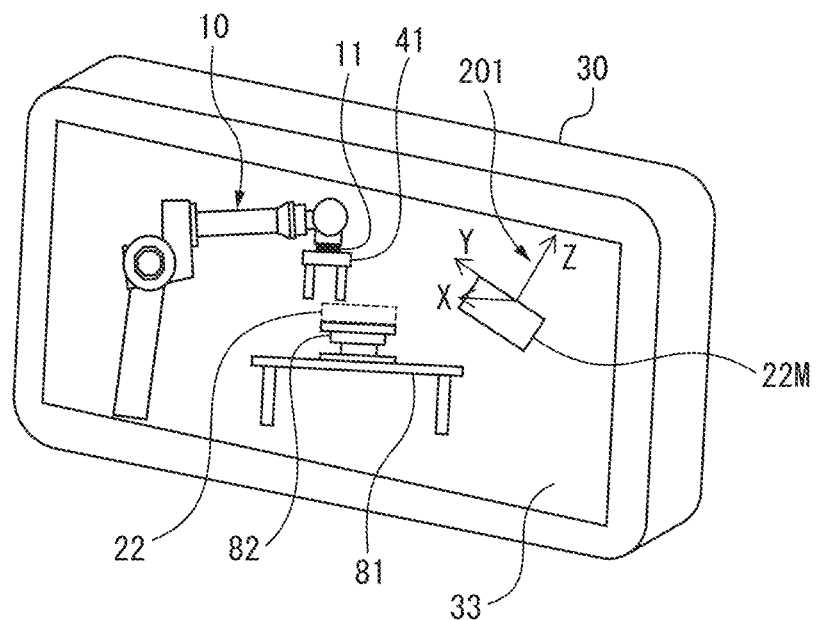
FIG. 11 is a diagram illustrating an image of a state where a virtual image of the force sensor is superimposed on a real space or a virtual space when there is an error in the positional information about the force sensor in the robot system in FIG. 9.

When the force sensor 22 is attached to the worktable 81 via the base 82, positional information (setting information) about the force sensor 22 is set as a position and a posture of coordinates in a robot coordinate system 101, for example. Herein, as an example, it is assumed that an original position and an original posture of the force sensor 22 are (x1, y1, z1, 0, 0, 0). Herein, it is assumed that the positional information (setting information) about the force sensor 21 is set to (x2, y2, z2, th1, th2, th3), x2≠x1, y2≠y1, z2≠z1, th1≠0, th2≠0, th3≠0 by mistake. In this case, the robot controller 50 obtains force and moment in a point of application of force by regarding the force sensor 22 in a position as illustrated in FIG. 10. As illustrated in FIG. 11, a virtual image superimposition display unit 304 (augmented reality image processing unit 305) of the teaching device 30 displays a virtual image (3D model) 22M of the force sensor 22 in a position and a posture according to the positional information (x2, y2, z2, th1, th2, th3) about the force sensor 22 on an image in which a camera 36 of the teaching device 30 captures the robot 10.

In this way, by superimposing and displaying, in an image in a real space in which the worktable 81 (or the base 82) being a predetermined object that supports the force sensor 22, the robot 10, and the like are captured, the virtual image 22M of the force sensor 22 in a position and a posture according to setting information, a user can instantly recognize an error in positional information (setting information) about the force sensor 22 from a comparison between the worktable 81 (or the base 82) and the position of the virtual image 22M on a display screen or a comparison between a real object of the force sensor 22 and the position of the virtual image 22M on the display screen.

Note that, as illustrated in FIG. 11, an image illustrating a coordinate system 201 of the force sensor 22 in addition to the virtual image 22M of the force sensor 22 may be superimposed and displayed. In this case, a direction (posture) of the positional information (setting information) about the force sensor 22 is easily visually recognized, and an error in the setting information can be more appropriately visually recognized. Alternatively, an image illustrating the coordinate system 201 of the force sensor 22 instead of the virtual image 22M of the force sensor 22 may be superimposed and displayed as a virtual image of the force sensor 22.

In the display example described above, it is an augmented reality in which the virtual image 22M of the force sensor 22 is superimposed and displayed on an image in a real space, but the teaching device 30 may display the image as illustrated in FIG. 11 as an image by a virtual reality. In this case, the virtual reality image processing unit 306 generates an image in which each object constituting the robot system 100A is disposed in a virtual space, based on actual arrangement information. Then, the virtual reality image processing unit 306 superimposes and displays the virtual image 22M of the force sensor 22 in such a way that the virtual image 22M has a position and a posture according to positional information (setting information) about the force sensor 22 in the virtual space. Also in this case, a user can instantly recognize an error in the positional information (setting information) about the force sensor 22 from a comparison between a model of the worktable 81 (or a model of the base 82) being a predetermined object that supports the force sensor 22 and the position of the virtual image 22M.

As described above, according to each of the embodiments, a user can quickly and easily visually recognize an error when there is the error in a set position and a set posture of a force sensor from a virtual image of the force sensor being superimposed and displayed on a real space or a virtual space.

Figure 12:
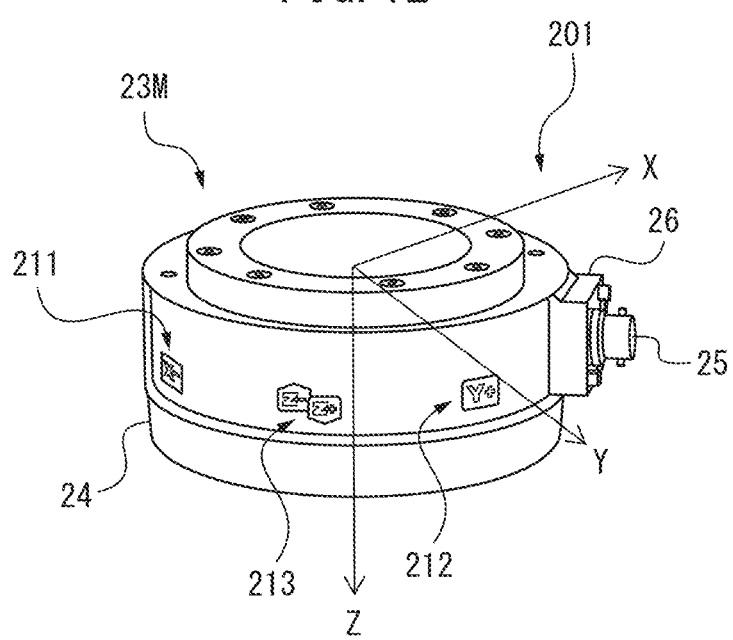
FIG. 12 is a diagram illustrating an example of a virtual image having asymmetry of the force sensor.

Note that, in the first embodiment and the second embodiment described above, a 3D model of a force sensor and a coordinate system of the force sensor are illustrated as an example of a virtual image of the force sensor, but various aspects are possible as the virtual image of the force sensor. Herein, with reference to FIG. 12, another example of the virtual image of the force sensor is illustrated. A virtual image 23M of a force sensor illustrated in FIG. 12 is an example of a virtual image having asymmetry. The virtual image of the force sensor has asymmetry, and thus an error in a setting of a posture can be easily recognized in particular.

Specifically, the virtual image 23M has a shape being set in such a way that a connector 25 and a connector attachment portion 26 are provided on a side surface of a body portion 24 having a cylindrical shape. In this way, the virtual image 23M has a shape having rotational asymmetry also about the Z-axis. The virtual image 23M of the force sensor has such a shape having rotational asymmetry also about the Z-axis, and thus, even when there is an error in a posture (angle position) about the Z-axis of positional information (setting information) about the force sensor, the error can be easily recognized from the virtual image 23M of the force sensor.

Note that, as illustrated in FIG. 12, in the virtual image 23M, marks 211, 212, and 213 indicating a position of each axis in the coordinate system of the force sensor may be formed. The mark 211 is indicated as "X–", and indicates that a direction with the mark 211 with respect to an origin position set on a central axis is a negative X-axis side. The mark 212 is indicated as "Y+", and indicates that a side with the mark 212 with respect to the origin position is a positive Y-axis direction. The mark 213 is a display in which "Z–" and "Z+" are disposed with "Z+" on a lower side, and indicates that a lower side of a center axis line is a positive Z-axis side. With such marks 211, 212, and 213, the coordinate system set in the force sensor can be recognized, and an error in a posture of the virtual image 23M can be more easily recognized. Note that FIG. 12 illustrates the coordinate system 201 designated by the marks 211, 212, and 213.

The present invention has been described above by using the typical embodiments, but it will be understood by those of ordinary skill in the art that changes, other various changes, omission, and addition may be made in each of the embodiments described above without departing from the scope of the present invention.

In each of the embodiments described above, the example in which an augmented reality image or a virtual reality image is displayed on a display device of a teaching device as a tablet type terminal is illustrated, but such an augmented reality image or a virtual reality image may be displayed on a head-mounting display device, for example. When superimposition and display of a virtual image by an augmented reality are performed, a glasses-type AR display device that superimposes a virtual image on a real scene may be used.

The functional block of the teaching device illustrated in FIG. 4 may be achieved by executing various types of software stored in a storage device by the processor of the teaching device, or may be achieved by a configuration in which hardware such as an application specific integrated circuit (ASIC) is a main body.

REFERENCE SIGNS LIST

10 Robot
11 Flange
15, 15A Bracket
21, 22 Force sensor
21M, 22M, 23M Virtual image
24 Body portion
25 Connector
26 Connector attachment portion
30 Teaching device
31 Processor
32 Memory
33 Display unit
34 Operating unit
35 Input/output interface
36 Camera
37 Inertial sensor
50 Robot controller
51 Processor
52 Memory
53 Input/output interface
54 Operating unit
81 Worktable
82 Base
100, 100A Robot system
101 Robot coordinate system
102 Flange coordinate system
201 Coordinate system
211, 212, 213 Mark
501 Storage unit
502 Operation control unit
301 Setting information storage unit
302 Model data storage unit
303 Camera position posture estimation unit
304 Virtual image superimposition display unit
305 Augmented reality image processing unit
306 Virtual reality image processing unit

The invention claimed is:

1. A teaching device, comprising:
   a setting information storage unit configured to store setting information that defines a position and a posture of a force sensor in a real space with respect to a coordinate system set in a real robot; and
   a virtual image superimposition display unit configured to superimpose and display a virtual image illustrating the force sensor on the real space or on an image of the real space, the real space including the real robot or a predetermined object that supports the force sensor, in such a way that the virtual image has a position and a posture according to the setting information in the real space.

2. The teaching device according to claim 1, wherein the virtual image is an image of a 3D model of the force sensor.

3. The teaching device according to claim 1, wherein the virtual image has asymmetry.

4. The teaching device according to claim 3, wherein the virtual image has rotational asymmetry about a predetermined coordinate axis in a coordinate system set in the force sensor.

5. The teaching device according to claim 1, wherein the virtual image includes an image illustrating a coordinate system set in the force sensor.

\* \* \* \* \*